United States Patent Office 3,700,652
Patented Oct. 24, 1972

3,700,652
(4-L-THREONINE)-MESOTOCIN
Maurice Manning, Toledo, Ohio, assignor to The Medical College of Ohio at Toledo, Toledo, Ohio
No Drawing. Filed Aug. 31, 1970, Ser. No. 68,569
Int. Cl. C07c 103/52
U.S. Cl. 260—112.5                           1 Claim

ABSTRACT OF THE DISCLOSURE

A novel biologically active (4-L-threonine)-mesotocin which is an analog of mesotocin in which the glutamine residue in position four is replaced by a threonine residue.

This invention relates to an analogue of mesotocin. More particularly, it relates to a novel compound (4-L-threonine)-mesotocin and to the preparation thereof.

The novel (4-L-threonine)-mesotocin provided by this invention corresponds to the following amino acid sequence:

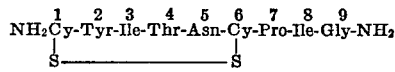

It is to be noted that the glutamine residue in the number four position of mesotocin is replaced by a threonine residue.

According to this invention, the aforesaid novel (4-L-threonine)-mesotocin was prepared as follows:

The key intermediate required for the synthesis of (4-L-threonine)-mesotocin is the protected nonapeptide, N-benzyl - oxycarbonyl - S - benzyl-L-cysteinyl-O-benzyl-L-tyrosyl - L - isoleucyl-O-benzyl-L-threonyl-L-asparaginyl-S - benzyl - L - cysteinyl - L - prolyl - L - isoleucyl - glycinamide. This protected nonapeptide was synthesized by the solid phase method (Merrifield, R. B. (1963), J. Amer. Chem. Soc., 85, p. 2149) essentially following the procedure outlined in the synthesis of oxytocin (Manning, M. (1968), J. Amer. Chem. Soc., 90, p. 1348) and [8-phenylalanine]-oxytocin (Baxter, J. W. M. et al. (1969), Biochemistry, 8, p. 3592). With the following slight modification, each of the three major steps, i.e., deprotection neutralization and coupling was carried out twice to ensure complete reaction at each stage. BOC-glycine was esterfied to the chloromethyl-copolystyrene-2% divinylbenzene resin and the stepwise synthesis was carried through eight cycles of deprotection, neutralization, and coupling with the appropriate BOC-amino acids to give the fully protected peptide-resin: N-benzyloxycarbonyl-S-benzyl - L - cysteinyl - O-benzyl-L-tyrosyl-L-isoleucyl-O-benzyl - L - threonyl - L - asparaginyl - S - benzyl - L - cysteinyl - L - prolyl - L - isoleucylglycyl - resin. BOC-amino acids with protected side chains were S-benzyl-L-cysteine, O-benzyl-L-threonine and O-benzyl-L-tyrosine. The final cysteine residue was added as the N-benzyloxycarbonyl-S-benzyl derivative. All coupling reactions to form peptide bonds were mediated by dicyclohexylcarbodiimide (Sheehan, J. C. et al. (1955), J. Amer. Chem. Soc., 77, p. 1067) in methylene chloride except the one involving the carboxyl group of asparagine, which was allowed to react in dimethylformamide as its nitrophenyl ester (Bodanszky, M. et al. (1959), J. Amer. Chem. Soc., 81, p. 5688). Cleavage of the protected peptide chain from the resin accomplished by ammonolysis (Bodanszky, M. et al., (1964), Chem. Ind. (London), p. 1423) following the procedure utilized in the solid-phase synthesis of oxytocin (Manning, M. (1968), J. Amer. Chem. Soc., 90, p. 1348) to give the required protected nonapeptide amide intermediate M.P. 243–244.5°: $[\alpha]_D^{23}$—25.8° (c. 1.0, dimethylformamide). Amino acid ratios found in an acid hydrolysate were aspartic acid, 1.01; threonine, 0.93; proline, 1.03; glycine, 1.00; isoleucine, 1.95; tyrosine, 0.79; S-benzylcystein, 1.90; ammonia, 2.00.

Conversion of this intermediate into (4-threonine)-moxytocin was effected by reduction with sodium in liquid ammonia (Stifferd, R. H. et al. (1935), J. Biol. Chem., 108, p. 753) (Du Vigneaud, V. et al. (1953), J. Amer. Chem. Soc., 75, p. 4879), (Du Vigneaud, V. et al. (1954), J. Amer Chem Soc, 76, p. 3115) followed by oxidation in aqueous solution at pH 6.5 with potassium ferricyanide (Hope, D. B. et al. (1962), J. Biol. Chem., 237, p. 1563). The product was purified by gel filtration on Sephadex G-15 in a two-step procedure using 50% acetic acid and 0.2 M acetic acid, respectively, for elution in each step (Manning, M., et al. (1968), J. Chromatog., 38, p. 396). The pharmacologically active material was obtained by lyophilization of the major component from the second elution step. Thin-layer chromatography and paper electrophoresis of the purified material indicated that it was homogeneous. Elemental analysis and analysis for amino acids and ammonia gave the expected results for (4-threonine)-moxytocin.

EXAMPLE 1

(a) N - benzyloxycarbonyl - S - benzyl - L-cysteinyl-O-benzyl - L - tyrosyl - L-isoleucyl-O-benzyl-L-threonyl-L-asparaginyl - S - benzyl-L-cysteinyl-L-prolyl-L-isoleucylglycyl-resin: The BOC-glycine-resin (4.0 g.) containing 1.92 mmole of glycine was introduced into the reaction vessel, washed with methanol and methylene chloride and allowed to swell in 30 ml. of methylene chloride overnight. The procedure outlined by Baxter et al. (1969) was followed to introduce each new residue into the growing peptide chain with however one additional modification: The coupling step was carried out using a two-step procedure as follows: The first step was carried out in the normal manner for a period of 4 hr. The resin was then washed successively with 30 ml. aliquots of methylene chloride, chloroform and methylene chloride to remove all traces of side-products and by-products of the reaction. The coupling step was then repeated and allowed to continue for a period of eight hours. Eight cycles of deprotection, neutralization and coupling were carried out on successive days with the following amino acid derivatives: BOC-L-isoleucine, BOC-L-proline, BOC-S-benzyl-L-cysteine, BOC-L-asparagine, BOC-O-benzyl-L-threonine, BOC-L-isoleucine, BOC-O-benzyl-L-tyrosine and N - benzyloxycarbonyl - S - benzyl - L - cysteine. All coupling reactions to form peptide bonds were mediated by dicyclohexyl carbodiimide (Sheehan, J. C., et al. (1955), J. Amer. Chem. Soc., 77, p. 1067) in methylene chloride except in the case of BOC-L-asparagine which was allowed to react as the nitrophenylester derivative (Bodanszky, M. et al. (1959), J. Amer. Chem. Soc., 81, p. 5688) in redistilled dimethylformamide.

At the conclusion of the synthesis, the protected peptide-resin was washed out of the reaction vessel with ethanol, dimethylformamide, and methanol, collected on a filter, and dried in vacuo, weight 6.54 g. The weight gain of 2.54 g. at this stage indicated a 100% incorporation of protected peptide based on the initial BOC-glycine content (1.12 mmole) in the resin.

(b) N - benzyloxycarbonyl - S - benzyl-L-cysteinyl-O-benzyl - L - tyrosyl - L - isoleucyl - O - benzyl - L-threonyl - L - asparaginyl - S - benzyl - L - cysteinyl - L - prolyl-L-isoleucylglycinamide: The protected peptide-resin (3.0 g.) was allowed to swell in 90 ml. of dry methanol for 3 hr. and cooled to —10° in a Dry-Ice acetone bath. Dry ammonia, from a boiling solution saturated with sodium, was bubbled through the cooled stirred suspension for 2.5 hr. The flask was stoppered and stirring was continued at +22° for 18 hr. The flask was recooled at —10° and connected to the water pump via two soda-lime U tubes and the cloudy suspension evacuated with stirring at room temperature for 3 hr. The complete removal of the methanolic ammonia was accomplished by continuing the evacuation on a high vacuum pump for an additional 3 hr. An all-glass lyophilizer, with the center flask containing a 100 ml. solution of 1:1 mixture of 12 N HCl and glacial acetic acid immersed in a Dry-Ice acetone both, was interposed between the flask and the pump to trap the evacuated ammonia vapors. The cleaved peptide was extracted with dimethylformamide (five 30-ml. portions) and methanol (three 10-ml. portions). The resin was removed by filtration and the dimethylformamide and methanol were removed in vacuo on a rotary evaporator. The residue was washed with methanol (three 30-ml. portions), which was removed each time by evaporation, and dried in vacuo overnight.

The product was purified by trituration with 95% ethanol (50 ml.) and the insoluble precipitate was collected on a filter, washed with ethanol (two 30-ml. portions) and diethyl ether (three 20-ml. portions), and dried in vacuo over $P_2O_5$ to give the required protected nonapeptide amide as a white amorphous powder: weight 1.09 mg., 243–244.5° $[\alpha]_D^{23}$ —25.8° (c. 1.0, dimethylformamide).

*Analysis.*—Calcd. for $C_{78}H_{97}N_{11}O_{14}S_2$ (percent): C, 63.4; H, 6.61; N, 10.44. Found (percent): C, 63.21; H, 6.65; N, 10.32.

The yield of the purified protected nonapeptide amide from the ammonolytic cleavage and trituration was 76.5% of the amount expected, based on the weight gain of the resin. The yield based on the amount of glycine originally esterified to the resin was 76.5%. Amino acid analysis gave: Asp, 1.10; Thr, 0.93; Pro, 1.03; Gly, 1.00; Ile, 1.95; Tyr, 0.79; Bz-Cys, 1.90; and $NH_3$, 2.00.

The protected nonapeptide amide gave a single spot, which traveled slightly faster than the protected nonapeptide amide intermediate of oxytocin (Manning, M., (1968) J. Amer. Chem. Soc., 90, p. 1348) when subjected to thin-layer chromatography. The protected nonapeptide amides dissolved in dimethylformamide (5–20 mg.), were applied separately on a thin layer (250μ) of silica gel mounted on a glass plate (20 x 20 cm.) and chromatographed for 3 hr. at room temperature with the upper phase of the solvent system butanol-acetic acid-water (4:1:5, v./v., ascending) (Partridge, S.M. (1948), Biochem. J., 42, p. 238). The $R_F$ values of the spots obtained on development with platinum reagent (Toennies, G. et al., (1951), Anal. Chem., 23, p. 823) were 0.83 for the protected nonapeptide amide intermediate of (4-threonine) mesotocin and 0.73 for the protected nonapeptide amide intermediate of oxytocin. No spots were detected with ninhydrin reagent.

(c) (4-L-threonine)-mesotocin: The protected nonapeptide (150 mg., 0.101 mmole) was dissolved in 250 ml. of anhydrous liquid ammonia, which was at its boiling point. Sodium was added from a small-bore glass tube until a faint blue color enveloped the solution for a 15-sec. period. Dry glacial acetic acid (3 drops) was added to discharge the color and the ammonia was evaporated in vacuo under anhydrous conditions at the water pump. The residue was dissolved in 280 ml. of 0.2% acetic acid and after adjustment of the pH to 7.0 with 2 N ammonium hydroxide, an excess of 0.011 M potassium ferricyanide (3.0 ml.) (Hope, D. B., et al. (1962), J. Biol. Chem., 237, p. 1563) was added to the stirred solution. After 10 min., 5 g. of AG3–X4 resin (chloride form) was added and stirring was continued for 5 min. to remove ferrocyanide and excess ferricyanide ions. The suspension was filtered through a bed of AG3–X4 resin (chloride form) (20 g. net weight) and washed through with 200 ml. of 0.2% acetic acid. The filtrate and washings were combined and the pH was adjusted to 3 with glacial acetic acid. The solution was lyophilized to give 610 mg. of crude product consisting of the required peptide, dimer, and inorganic salts. Purification was effected by the method of Manning et al. (1968b), J. Chromatog., 38, p. 396. The lyophilizate was dissolved in 5.0 ml. of 50% acetic acid and applied to the top of a column of Sephadex G–15 (Pharmacia Fine Chemicals, Uppsala, particle size 40–120μ, column size 110 x 1.2 cm.) which had been pre-equilibrated with 500 ml. of 50% acetic acid. The sample was washed into the column with an additional 2 ml. of 50% acetic acid and eluted with 50% acetic acid at a rate of 9.0 ml./hr., 60 fractions of 2.4 ml. each were collected.

A plot of the Folin-Lowry color values (Lowry, R. J., et al. (1951), J. Biol. Chem., 193, p. 265) of the various fractions showed the presence of two peaks with maxima at tubes 27 and 34, respectively, clearly separated from salt by 15 tubes. The contents of the second peak (tubes 29–34) which contained most of the active peptide, as detected by oxytocic assay (Munsick, R. A., et al. (1960), Endocrinology, 66, p. 860) were pooled, diluted with two volumes of distilled water, and lyophilized. Meanwhile the Sephadex column was re-equilibrated with 500 ml. of 0.2 N acetic acid over a period of 20 hr. The lyophilized powder (51.8 mg.) from the second peak was dissolved in 2.0 ml. of 0.2 N acetic acid, and eluted and collected as before, at a rate of 9.0 ml./hr. The required peptide emerged as a single, nearly symmetrical peak preceded by a small amount of dimer. The contents of this main peak (tubes 31–37) were pooled, diluted with two volumes of water, and lyophilized, to give the desired product as a white fluffy powder (51.8 mg.); this represents a yield of 49% in the reduction-reoxidation step of the protected nonapeptide and an over-all yield of 38%, based on the initial glycine incorporation on the resin, $[\alpha]_D^{24}$—8.0° (c. 0.527, 1 N acetic acid). For elemental analysis a sample was dried at 25° over $P_2O_5$ in vacuo for 24 hours.

*Analysis.*—Calcd. for $C_{42}H_{66}N_{11}O_{12}S_2$:

(percent): C, 48.3; H, 6.98; N, 14.07. Found (percent): C, 48.00; H, 6.69; N, 14.04. Amino acid analysis gave: Asp, 1.12; Thr, 1.00; Pro, 1.19; Gly, 1.00; Cys, 2.14; Ile, 2.21; Tyr, 0.99; and $NH_3$, 2.00.

Aliquots of (4-threonine)-mesotocin (40–60 mg.) and oxytocin (40–60 mg.) as well as a mixture of 40 mg. of each of the two peptides dissolved in water were subjected to thin-layer chromatography and run under the same conditions mentioned above for their protected nonapeptide amide intermediates. Single spots were detected using both the platinum (Toennies, G., et al. (1951), Anal. Chem., 23, p. 823) and the ninhydrin reagents, with $R_F$ values of 0.39 for (4-L-threonine)-mesotocin and 0.29 for oxytocin. The mixture of the two peptides had been separated into two distinct spots that agreed with these $R_F$ values. Likewise, only one component in the direction of the cathode was observed when paper electrophoresis of a further aliquot (50 mg.) in two pyridine acetate buffers of pH 3.5 and 6.5 was carried out using the same detecting reagents.

Pharmacological evaluation: A sample of the lyophilized peptide was dissolved in 50 mM. acetic acid containing 5 g./l. of chlorobutanol (USP). This solution was stored under refrigeration and samples were removed as needed for biological assays. Activities on the rat uterus in vitro, suspended in solutions without $Mg^{2+}$ were performed as described in Munsick, R. A. (1960), Endocrinology, 66, p. 451. Rabbit milk ejection, fowl vasodepressor, and isolated bullfrog bladder (hydroosmotic) assays were performed by methods described in Munsick, R. A., et al (1960), Endocrinology, 66, p. 860. Antidiuretic assays were performed by the method described in Sawyer, W. H. (1958), Endocrinology, 63, p. 694, in rats under ethanol anesthesia. Vasopressor assays were done on pithed rats (Sawyer, W. H. (1966), The Pituitary Gland, vol. 3, Harris, G. W. and Donovan, B. T., Eds., London, Butterworth, p. 288). All activities are reported in terms of the USP Posterior Pituitary Reference Standard. The results are shown in Table I: All bioassays were carried out under the direction of Dr. W. H. Sawyer at the Department of Pharmacology, Columbia University, New York.

TABLE I

Pharmacological activities (in USP units per milligram) of oxytocin, (4-L-threonine)-mesotocin, (4-threonine)-oxytocin, and three other 4-substituted analogs of oxytocin:

| Oxytocin and analogs | Rat uterus | Fowl vaso- depressor | Rabbit milk ejection | Rat vaso- pressor | Rat anti- diuretic |
|---|---|---|---|---|---|
| Oxytocin | 450 | 450 | 450 | 5 | 5 |
| (4-threonine)- mesotocin | 520 | 1,545 | | 1.08 | 2.6 |
| (4-L-threonine)- oxytocin | 890 | 1,470 | ¹ 542 | 0.45 | 1.3 |
| (4-L-serine)- oxytocin | 190 | 230 | 245 | 0.1 | 1.2 |
| (4-α-amino butyric acid)-oxytocin | 72 | 108 | 225 | 0.1 | 0.2 |
| (4-L-valine)- oxytocin | 139 | 230 | 419 | 0.005 | 0.5 |

¹ (Rat=532.)

(4-L-threonine)-mesotocin, while not as potent as (4-threonine)-oxytocin, is still more potent than oxytocin in the rat uterus and fowl vasodepressor assay systems. Likewise, it possesses less of the unwanted vasopressin side-effects of oxytocin—i.e. antidiuretic and rat vasopressor potencies. Therefore, the substitution of glutamine residue in the 4 position of oxytocin and in one of its natural congeners—mesotocin—by a threonine residue results in the same kind of dramatic effect on the known pharmacological potencies of these two naturally occurring peptides.

What is claimed is:

1. (4-L-threonine)-mesotocin.

References Cited

UNITED STATES PATENTS 3,296,243  1/1967  Johl et al. _____ 260—112.5

OTHER REFERENCES

Guttmann: Helv. Chim. Acta 45, 2622–2627 (1962).
Manning et al.: Nature 227, 715–716 (1970).
Schroder et al.: The Peptides, vol. II, Academic Press, New York (1966), pp. 320–335.

LEWIS GOTTS, Primary Examiner

R. J. SUYAT, Assistant Examiner

U.S. Cl. X.R.

424—177